(12) United States Patent
Hamid et al.

(10) Patent No.: US 10,746,373 B2
(45) Date of Patent: Aug. 18, 2020

(54) CONDENSATION COLLECTION DEVICE

(71) Applicant: Flex-N-Gate Advanced Product Development, LLC, Tecumseh (CA)

(72) Inventors: Muhammed A. Hamid, Canton, MI (US); John J. Randolph, Dearborn Heights, MI (US); Chirag Hiremath, Farmington Hills, MI (US); Charles F. Schweitzer, Livonia, MI (US)

(73) Assignee: Flex-N-Gate Advanced Product Development, LLC, Tecumseh (CA)

( * ) Notice: Subject to any disclaimer, the term of this patent is extended or adjusted under 35 U.S.C. 154(b) by 0 days.

(21) Appl. No.: 15/726,727

(22) Filed: Oct. 6, 2017

(65) Prior Publication Data
US 2018/0100629 A1 Apr. 12, 2018

Related U.S. Application Data

(60) Provisional application No. 62/404,926, filed on Oct. 6, 2016.

(51) Int. Cl.
*F21S 45/47* (2018.01)
*B60Q 1/04* (2006.01)
*F21S 45/33* (2018.01)

(52) U.S. Cl.
CPC ............ *F21S 45/47* (2018.01); *B60Q 1/04* (2013.01); *F21S 45/33* (2018.01); *B60Q 2900/00* (2013.01)

(58) Field of Classification Search
CPC .............. F21S 45/47; F21S 45/33; B60Q 1/04
USPC ........................................................ 362/544
See application file for complete search history.

(56) References Cited

U.S. PATENT DOCUMENTS

| | | | | |
|---|---|---|---|---|
| 4,802,068 A * | 1/1989 | Mokry | ............... | F21V 31/03 362/547 |
| 6,071,000 A * | 6/2000 | Rapp | ............... | F21S 48/332 362/362 |
| 6,210,014 B1 * | 4/2001 | Kubizne | ............... | F21S 45/37 362/96 |
| 6,422,729 B1 * | 7/2002 | Rohrbach | ............... | F21S 48/335 362/539 |
| 6,883,948 B2 * | 4/2005 | VanDuyn | ............... | F21S 45/33 362/547 |
| 6,976,770 B2 * | 12/2005 | Trimpe | ............... | F21S 48/155 362/267 |
| 7,883,244 B2 * | 2/2011 | Hsu | ............... | F21V 31/03 362/267 |
| 8,465,186 B2 * | 6/2013 | Michalak | ............... | F21S 41/28 362/520 |
| 9,885,456 B2 * | 2/2018 | Yano | ............... | F21V 31/03 |
| 2006/0150817 A1 * | 7/2006 | DeGuiseppi | ............... | B01D 53/261 96/108 |
| 2006/0254227 A1 * | 11/2006 | Scagliarini | ............... | B01D 53/268 55/385.4 |

(Continued)

FOREIGN PATENT DOCUMENTS

WO 2007073721 A1 7/2007

*Primary Examiner* — Bryon T Gyllstrom
(74) *Attorney, Agent, or Firm* — Erise IP, P.A.

(57) ABSTRACT

A system includes one or more channel members used to vent a headlight housing. An aperture is included in the upper part of the housing that allows for the circulation of hot air out of the headlight internal chamber. At an outlet of the channel member, a hydrophobic membrane can be used to allow the venting of hot air while preventing condensate from the environment into the system.

16 Claims, 8 Drawing Sheets

(56) References Cited

U.S. PATENT DOCUMENTS

| | | | |
|---|---|---|---|
| 2008/0060327 A1* | 3/2008 | Scagliarini | B01D 53/268 55/385.3 |
| 2011/0280033 A1* | 11/2011 | Kishimoto | F21S 41/16 362/543 |
| 2016/0153648 A1* | 6/2016 | Lee | F21V 29/763 362/249.01 |

* cited by examiner

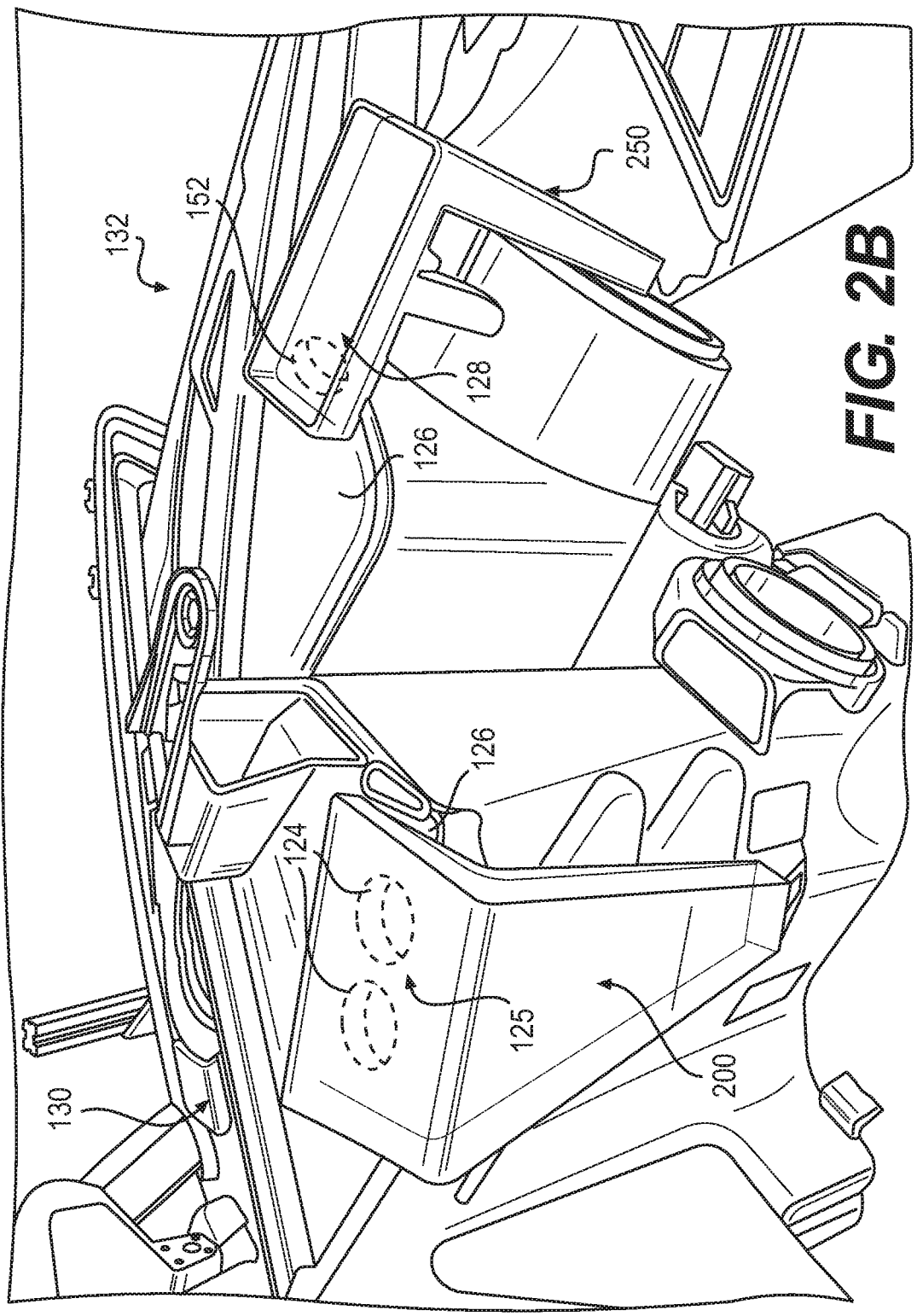

CONDENSATION COLLECTION DEVICE

CROSS-REFERENCE TO RELATED APPLICATIONS

This application claims the benefit of U.S. Provisional Application No. 62/404,926 filed on Oct. 16, 2016, the entire contents of which are herein incorporated by reference.

BACKGROUND OF THE INVENTION

1. Field of the Invention

The disclosed embodiments relate generally to vehicle headlight configurations, and more specifically to condensation control in lamps.

2. Description of the Related Art

When high humidity air exists inside of a vehicle headlamp, a subsequent cooling of the air can result in condensation. The cycle condensation can occur over and over due to the time-separated and repeated use of the lamps. The appearance of the condensation, and gradual drying of water droplets can cloud the lens of the vehicle headlight. As is widely known, most modern headlights have lenses which are optical he an active, and thus are clear. This makes the appearance dry condensate cloud the normal appearance.

Aside from these cosmetic issues, the repeated condensation can also result in the contamination internal features. For example, electrical components can't be compromised and degraded.

Some conventional techniques for reducing condensation problems and headlights involved venting technologies. For example, U.S. Pat. No. 6,422,729 issued to Rohrbach et al. discloses a ventilation system combined with a filter.

SUMMARY

In embodiments, a system is disclosed which is incorporated into a luminaire having light source included in a housing, where the housing defines an internal chamber, and a window through which light from the source is emanated. The system, in embodiments, includes a first channel member, the first channel member having a first inlet and a first outlet, the first inlet being a first opening existing in a first location in an upper portion of the housing, the first outlet being outside the housing and located vertically below the first inlet such that when the air in the temperature of a first body of air in the internal chamber is elevated, the first body of air passes out through the first inlet into the first channel, cools, and is released via the first outlet into a first area outside of the chamber.

In some embodiments, the first outlet is blocked by a first hydrophobic device, the first hydrophobic device allowing for the passage of humid air into the environment, but blocking against the introduction of liquid water into the channel from the environment. In other embodiments, the first inlet is located vertically above a first light source located in the luminaire. In yet other embodiments, the first channel includes an upper chamber which receives saturated air from the first aperture, and the first channel then leads to a downwardly-extending portion of the first channel, the downwardly-extending portion terminating in the first outlet. In further embodiments, the downwardly-extending portion of the first channel tapers as it extends down from the upper chamber to the first outlet. In some embodiments, the downwardly-extending portion of the first channel maintains substantially the same cross-sectional configuration as it extends down from the upper chamber.

In some embodiments, a second channel member is provided. The second channel member has a second inlet and a second outlet, the second inlet being a second opening existing in a second location in an upper portion of the housing, the second outlet being outside the housing and located vertically below the second inlet such that when the air in the temperature of a second body of air in the internal chamber is elevated, the second body of air passes out through the second inlet into the second channel, cools, and is released via the second outlet into a second area outside of the chamber. In embodiments, the first inlet is located vertically above a first light source located in the luminaire and the second inlet is located vertically above a second light source. In embodiments, the first inlet is located on an relatively opposite side of said headlight from the second inlet. In yet further embodiments, the second outlet of the second channel member includes a second hydrophobic device.

Alternatively, a method is disclosed. In embodiments, the method involves providing a first aperture in a headlight housing; creating a conduit between the first aperture and an outside environment; and releasing hot air through the conduit from the internal chamber into the outside environment to reduce condensation in the headlight. In embodiments, the method includes blocking the outlet with a hydrophobic device, such that allowing for the passage of humid air into the environment, but blocking against the introduction of liquid water into the channel from the environment. In other embodiments, the method includes spacing a second aperture apart from a location of the first aperture, and releasing hot air through a second conduit from the internal chamber to further the reduce condensation in the internal chamber.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 2B is a perspective rear view of the headlight showing channel member devices added which aid in venting the housing;

DETAILED DESCRIPTION

Embodiments of the present invention provide systems and a method for eliminating or reducing condensation in a headlamp.

Figure 1A:
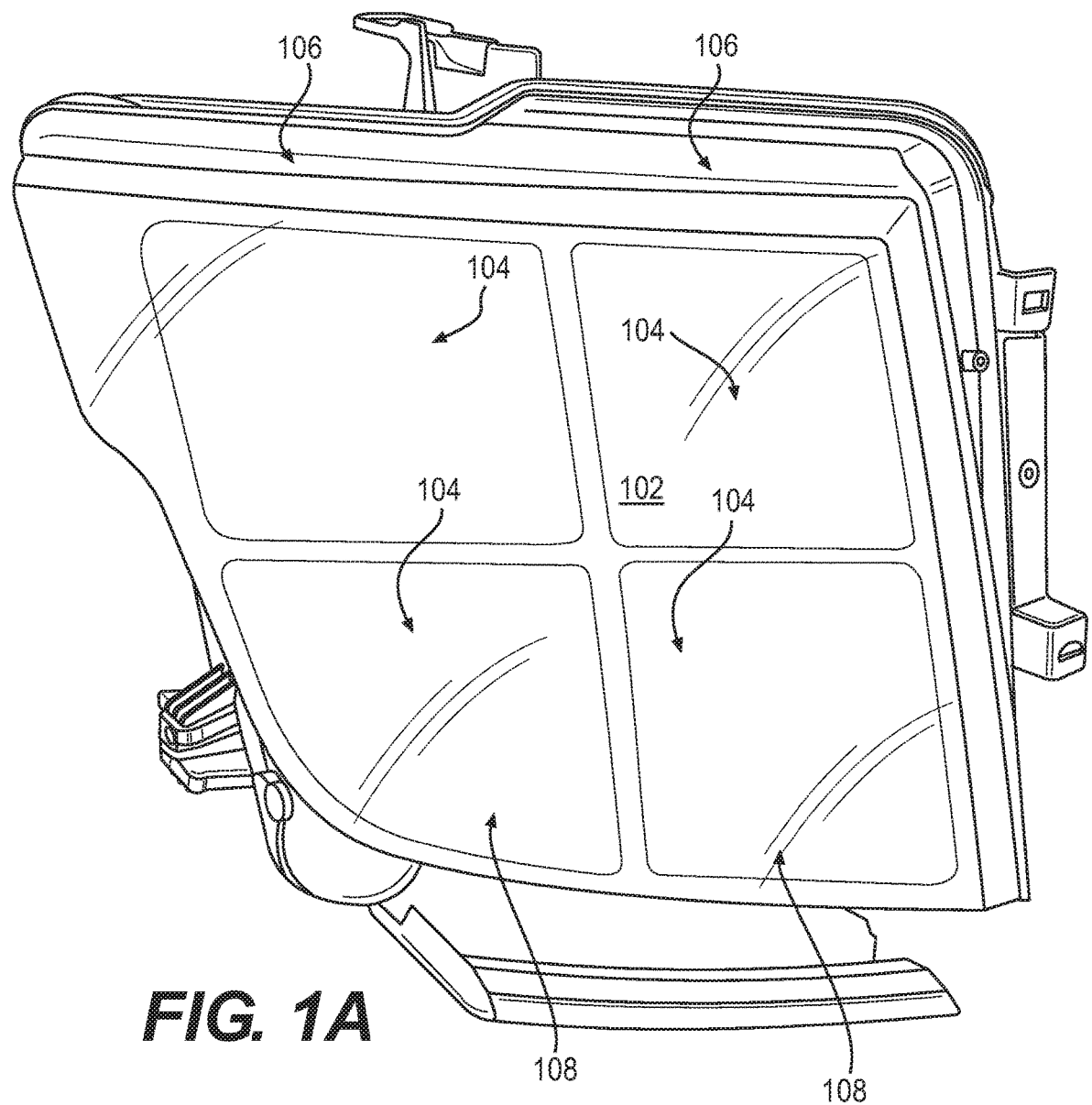
FIG. 1A shows a conventional vehicle headlight from a perspective front view.

Referring to FIG. 1A, which shows a front view, it can be seen that a headlight system 100 includes a lens 102 that encapsulates different lighting and reflector configurations 104. As the headlight operates, the area behind an upper area of the lens 106 becomes relatively hot (as compared to the lower areas 108), because heat generated by the lighting equipment 104 rises. This heat causes the air to become saturated such that when it encounters the cool lens 106, it creates condensation which can cloud the lens—especially in the upper areas 106 of lens 102.

Figure 1B:
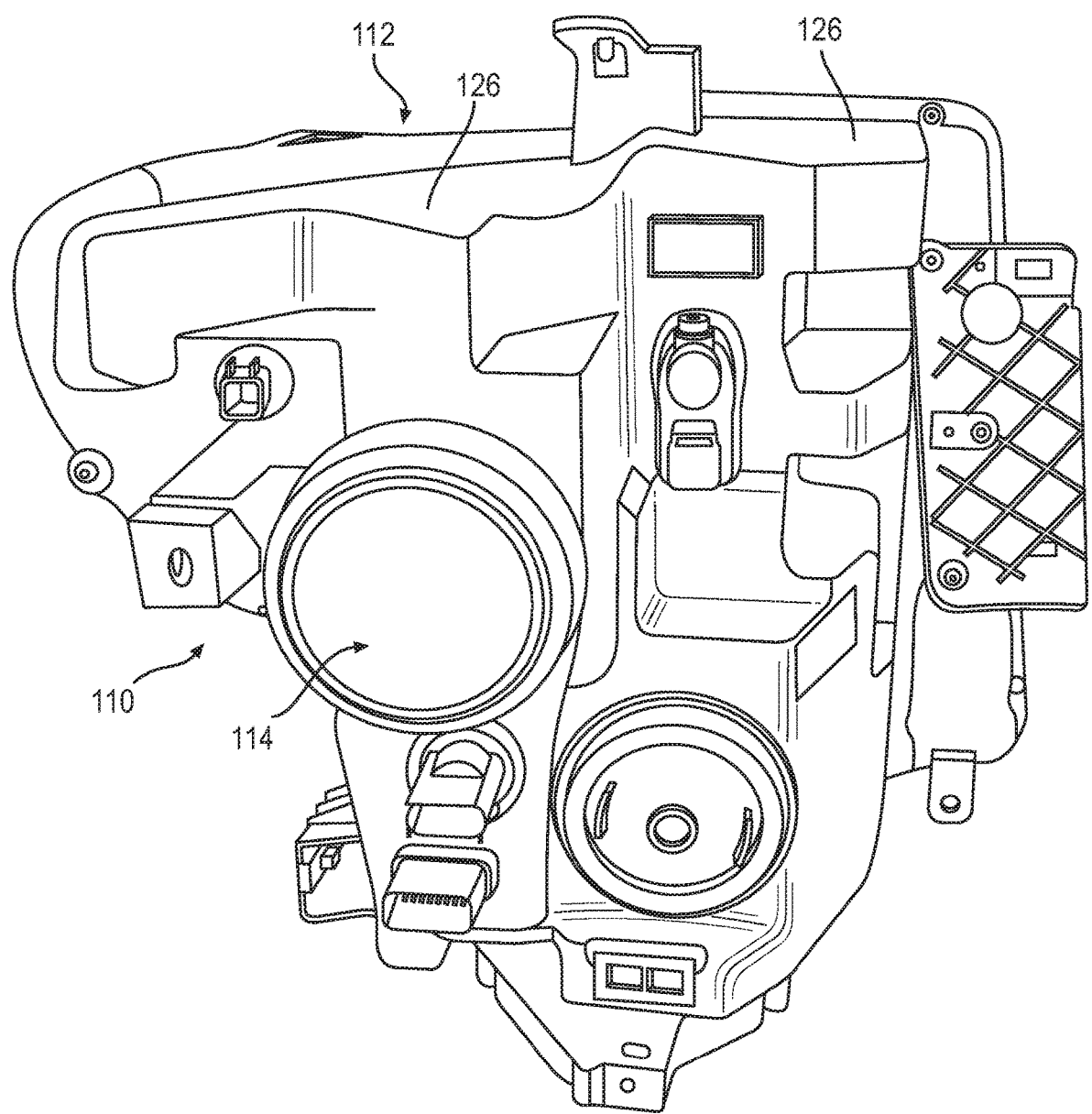
FIG. 1B shows a conventional vehicle headlight from a perspective rear view before modification has been made to the headlight housing.

FIG. 1B shows the headlight of FIG. 1A from the rear, revealing a housing 110. A front 112 of the housing 110 receives the lens 102 in a sealed relationship. Thus, the headlight internals are protected against the elements. A back 114 of housing includes an upper surface 116. Normally this upper surface 116, along with the rest of the housing, is solid and does not allow for the escape of air or water as shown in FIG. 1B.

Figure 2A:
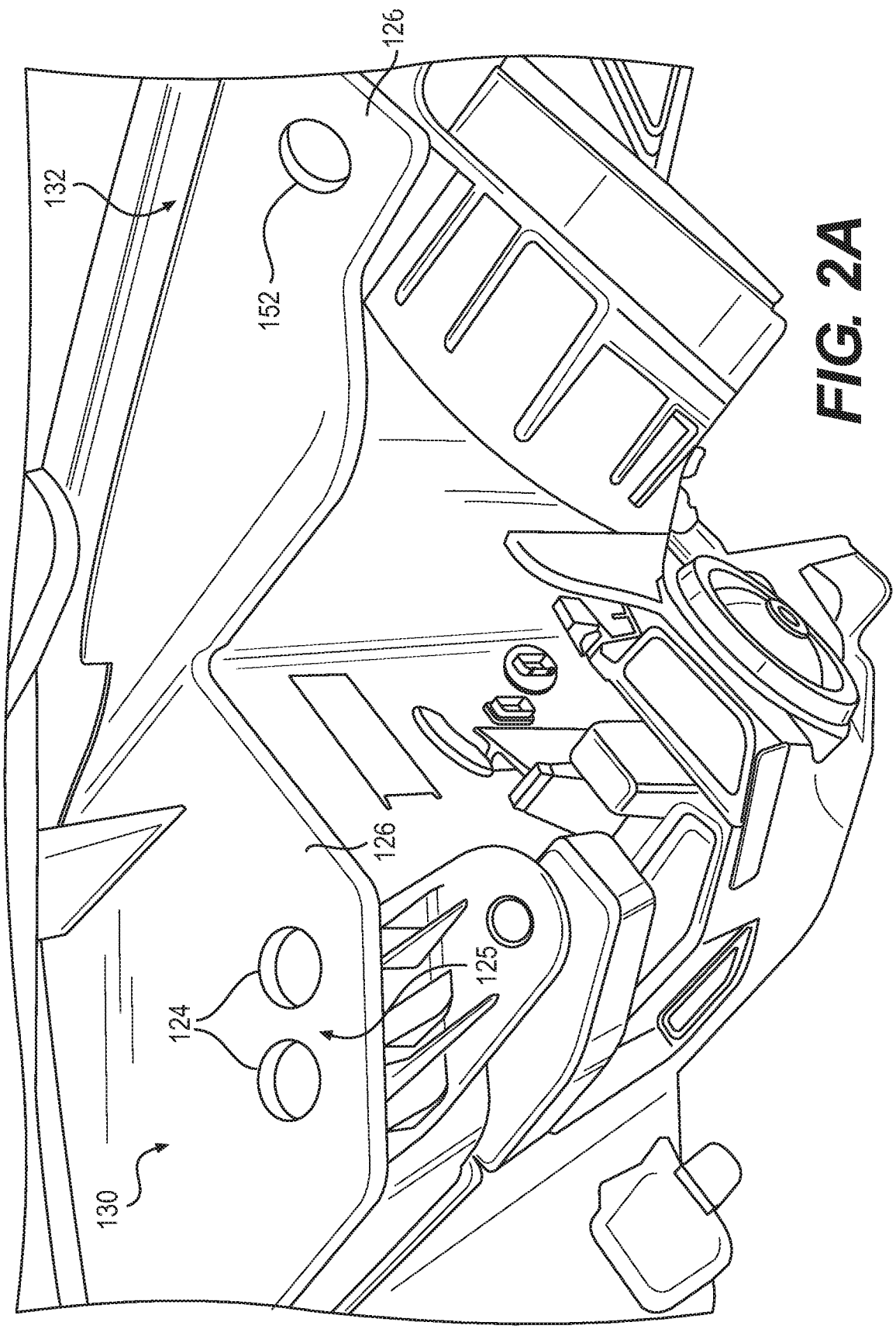
FIG. 2A is a perspective rear view of the headlight showing apertures created in the upper surface of the housing.

FIGS. 2A and 2B show how the housing 110 has been modified to eliminate the condensation problems existing in the arrangements shown in FIGS. 1A and 1B.

In FIG. 2A, a pair of apertures 124 are made into a first location 125 on a first side 130 in the level upper covering 122 of the housing. (Note that the two white circles show the cutout locations existing in the disclosed embodiment. The photographic rectangular cutouts shown illustrate one of many alternative embodiments in which alternative shapes and sizes of apertures could be used to accomplish similar objectives). In a second location 128 of the upper covering 122 of the housing, a single ventilating aperture 152 has been created on a second side 132 of the level upper covering 126. The pair of apertures 124 are more forward and laterally inward relative to the single aperture 152. The first pair or apertures 124 have been located substantially above the light source in the particular chamber below, to maximize the escape of hot air. Two apertures (or alternatively, a relatively large single hole) have been used, because the chamber below tends to generate more heat than the other lighting arrangements in the housing. On the other side of the housing, single hole 152 (or alternatively, any similar sort of aperture) can be used above the chamber below because, in the disclosed embodiment, the heat generated by the light source, or sources, in that chamber is lower. Thus, the aperture sizing can be increased or decreased to accommodate relatively high or low heat-generation levels of the particular light source arrangement located below.

FIG. 2B reveals that a first channel member 200 is mounted over the aperture pair 124 at a first end of the upper surface 116 of the housing, and a second channel member 250 is mounted at a second end of the upper surface 116 of the housing. As will be discussed in more detail hereinafter, channel members 200 and 250 enable hot air to be conducted out of the housing, but at the same time, maintain a water-tight seal of the system.

It should be recognized that the term "channel" as referred to in this application should not be considered as being limited to any particular configuration or in any other respect unless otherwise so recited in the claims. The term means generally that the device allows for some passage of air, without requiring any particular extend of air movement, shape of channel conduit, etc.

Similarly, the terms "inlet" and "outlet" when used in this application should be given the general meaning as a thing that allows air in (e.g., to the channel), and out of the channel, respectively. The terms are not intended to impart any particular configuration unless otherwise specified.

Figure 3A:
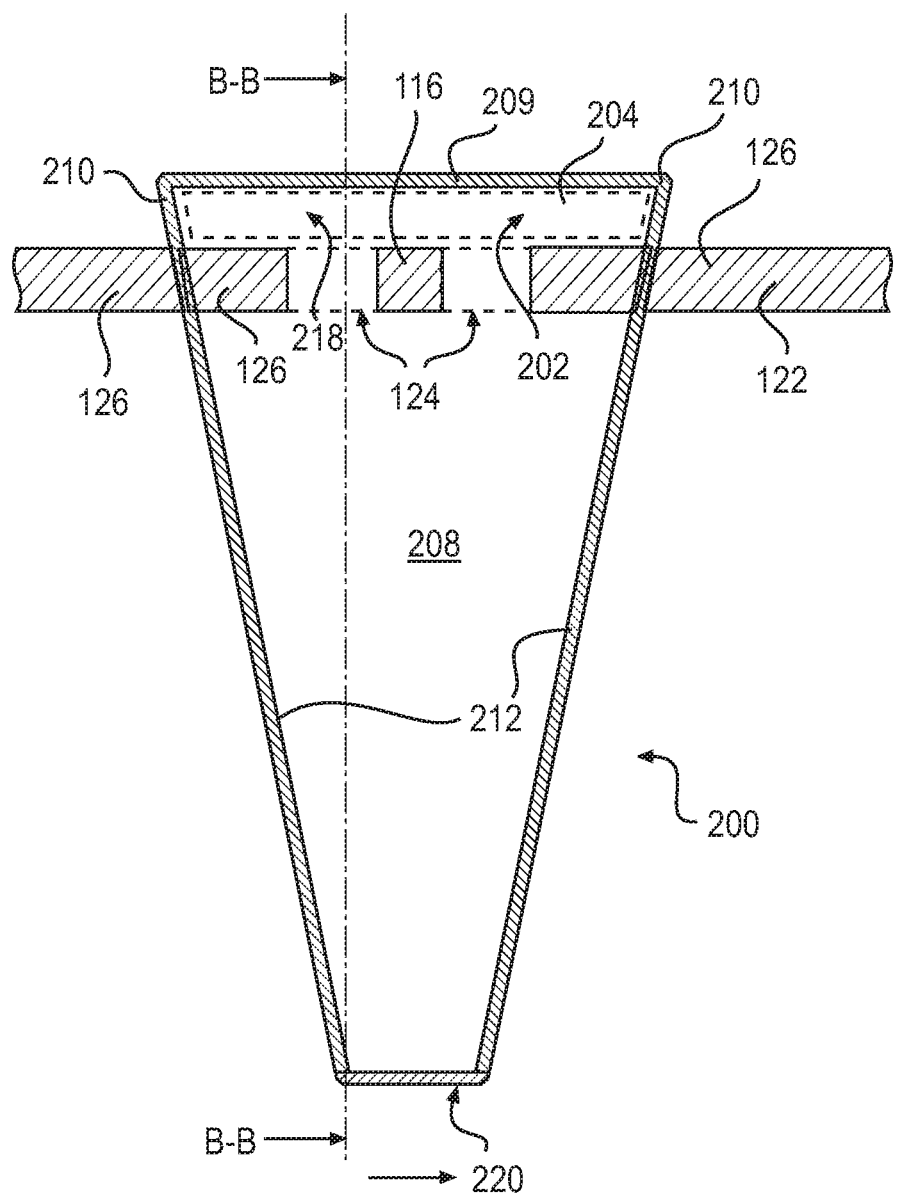
FIG. 3A is a front view of a first channel member device that has been added to the housing.
Figure 3B:
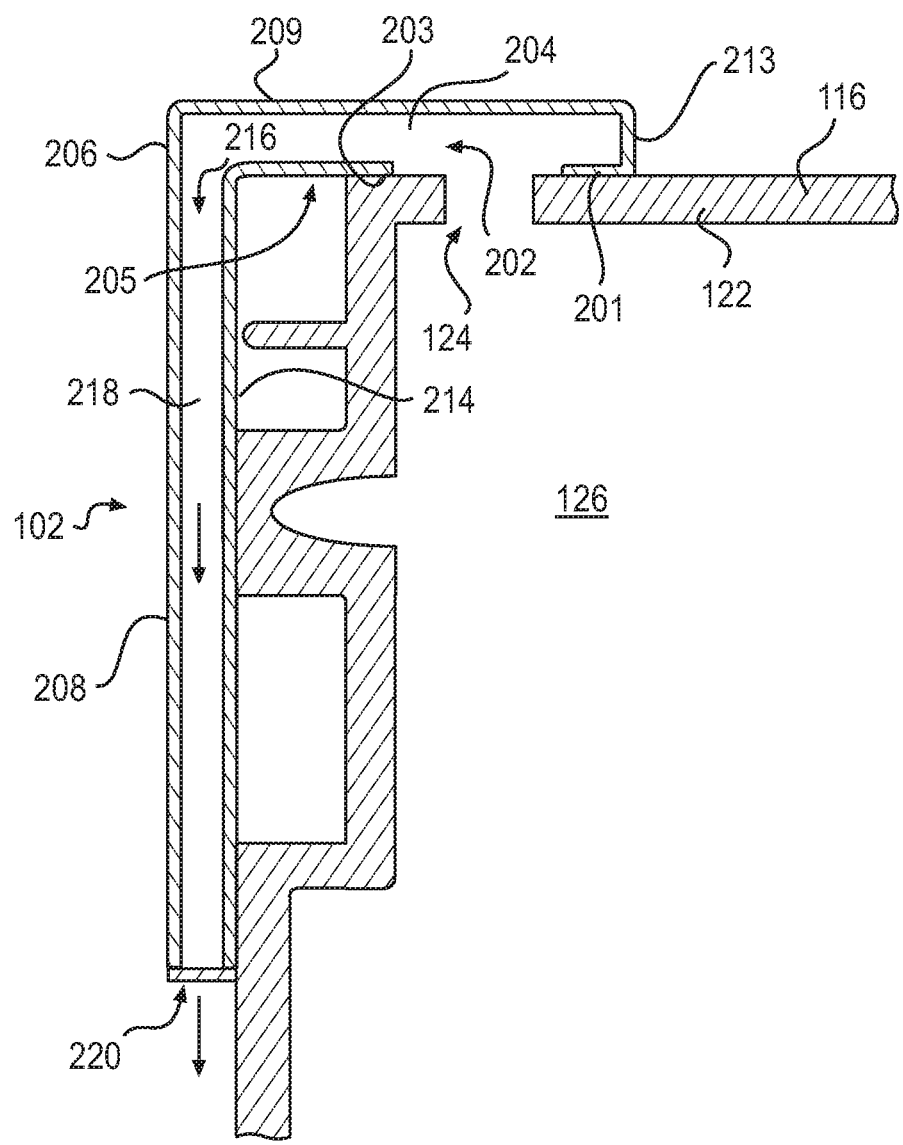
FIG. 3B is a view taken at Section B-B taken from FIG. 3A.

The details regarding the first channel member 200 can be seen in FIGS. 3A and 3B. Referring to these figures, in the disclosed embodiment, two mounting surfaces 201 and 203 (see FIG. 3B) on the channel member 200 are adhered to the upper surface 116 of the housing such that the aperture pair 124 vent into a channel inlet 202. There, an upper, outwardly-directed chamber 204 is defined by: (i) a solid top 209; (ii) an upper portion 206 of a front face 208; (iii) opposing upper portions 210 of converging side walls 212; and (iv) a terminating wall 213.

In operation, the one or more channel members 200 and 250 are able to reduce the buildup of water condensate within the headlamp. Condensation occurs in active lamps because air heated by the lamp moves upward more than the air existing in comparatively cooler regions. If the hot air is let to escape outside the lamp and replaced by cooler air, the relatively low humidity of the air reduces the probability of condensation.

Thus, the channel members 200 and 250 receive and then trap the hot air and condense it outside the lamp. This keeps the overall temperature inside the lamp volume lower and also enhances better air circulation through the lamp. The hot air is then passed out of the device through a hydrophobic membrane.

With respect to channel member 200, once the hot, highly-humid air passes completely through the upper, outwardly-directed chamber 204, the relatively hot, relatively humid air drops over a bend 216 in the channel and travels downward in a vertical passageway 218. Vertical passageway 218 is defined by the front face 208, back wall 214, and converging side walls 212. At the bottom of the vertical passageway 218, the hot air is able to escape though a hydrophobic device 220. Hydrophobic device 220 is a device that allows the outward passage of high-humidity air, but will not allow liquid water into the system from the outside environment. In the disclosed embodiments, hydrophobic device 220 is a hydrophobic membrane 220 (e.g., a hydrophobic patch). Patch 220 is allows for the escape of humid air, while at the same time sealing the headlamp from condensation existing in the surrounding environment. Although hydrophobic membrane 220 caps off an exhaust vent formed at the bottom of the vertical passageway 218, it still allows hot saturated air, along with any condensate, to escape. Membrane 220, however, will not allow liquid water to enter the housing from the outside environment. This prevents invasion of the sealed headlight by rain, snow, or other potentially compromising sources of water from the environment in which the headlight is used.

Figure 4A:
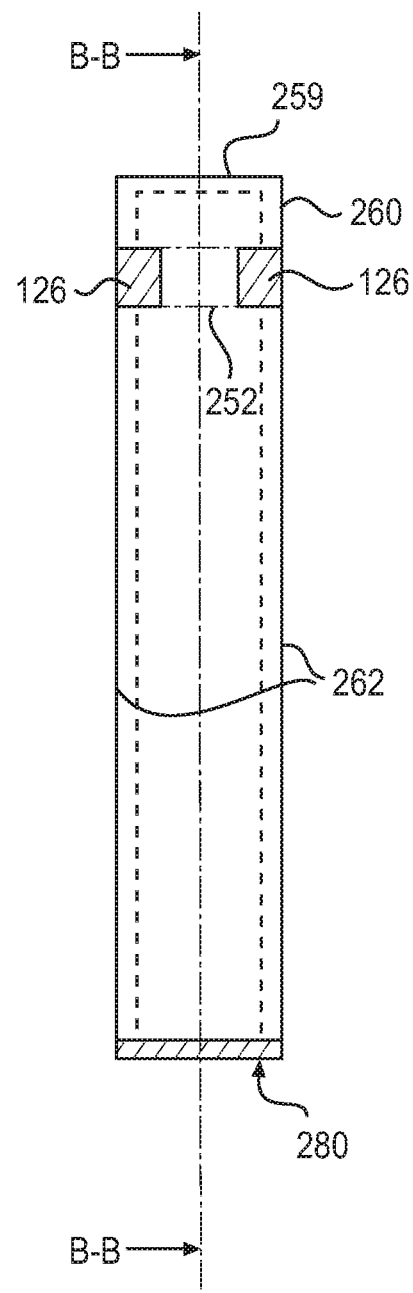
FIG. 4A is a front view of a second channel member device that has been added to the housing.
Figure 4B:
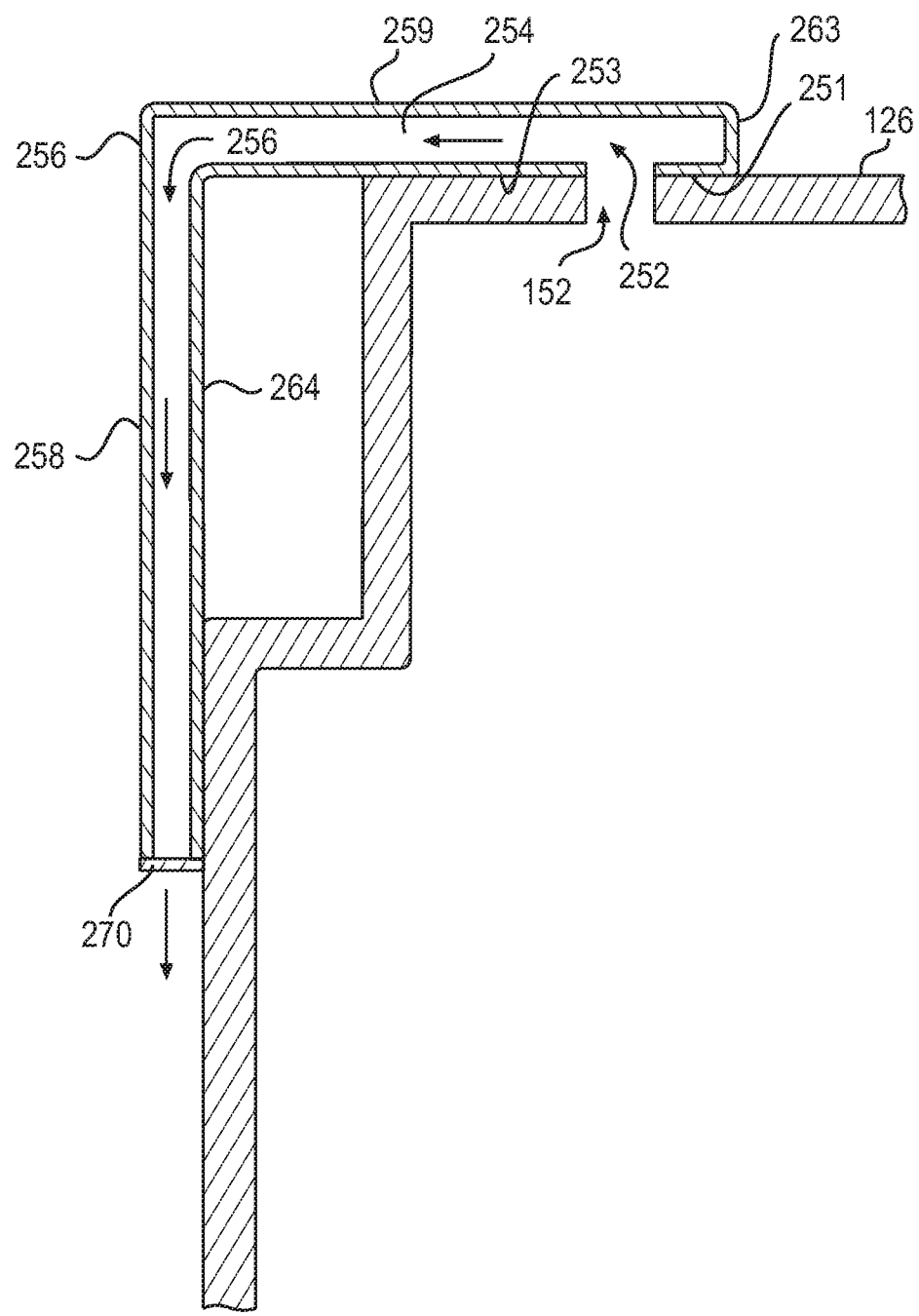
FIG. 4B is a view taken at Section B-B taken from FIG. 4A.

The details regarding the second channel member 250 can be seen in FIGS. 4A and 4B. Referring first to FIG. 4B, the second channel member 250, in the disclosed embodiment, provides two mounting surfaces 251, and 253, which are adhered to the upper surface 116 of the housing such that the single ventilating aperture 152 releases saturated hot air into a channel inlet 252. There, an upper, outwardly-directed chamber 254 is defined by: (i) a solid top 259; (ii) an upper portion 256 of a front face 258; (iii) opposing upper portions 260 of substantially parallel opposing side walls 262; and (iv) a back-terminating wall 263.

Once through the upper, outwardly-directed chamber 254 in the second channel member 250, the relatively hot, humid air drops over a bend 256 in the channel and travels down a vertical passageway 268 which is defined by the rectangular front face 258, back wall 264, and substantially parallel opposing side walls 262. Once the relatively hot, highly humid air reaches the bottom of the vertical passageway 268, the hot air is able to escape though a hydrophobic patch 270, which caps off the bottom of the vertical passageway 268. Like with the other channel member, a hydrophobic patch 270 used here allows hot saturated air to escape, but will not allow liquid water to enter the housing.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A luminaire having at least one light source included in a housing, the housing defining an internal chamber, and a window through which light from the source is emanated, the luminaire further comprising:
    a first channel member, the first channel member having a first air-intaking inlet and a first air-exhausting outlet, the first inlet being a first opening existing in a first location in an upper portion of the housing, the first inlet being located substantially directly above a first light source, the first outlet being outside the housing and located vertically below the first inlet such that when the temperature of a first body of air surrounding the at least one light source in the internal chamber is elevated, the first body of air rises upward due to convection in the housing, along a convection path leading directly upwards toward and into the first inlet of the channel member, then travels through the first channel member, cools, and is released via the first outlet into a first area outside of the chamber.

2. The luminaire of claim 1 wherein the first outlet is blocked by a first hydrophobic device, the first hydrophobic device allowing for the passage of humid air into the environment, but blocking against the introduction of liquid water into the channel from the environment.

3. The luminaire of claim 1 wherein the first channel includes an upper chamber which receives saturated air from the first aperture, and the first channel then leads to a downwardly-extending portion of the first channel, the downwardly-extending portion terminating in the first outlet.

4. The luminaire of claim 3 wherein the downwardly-extending portion of the first channel tapers as it extends down from the upper chamber to the first outlet.

5. The luminaire of claim 3 wherein the downwardly-extending portion of the first channel maintains substantially the same cross-sectional configuration as it extends down from the upper chamber.

6. The luminaire of claim 1 comprising:
    a second channel member, the second channel member having a second inlet and a second outlet, the second inlet being a second opening existing in a second location in an upper portion of the housing, the second inlet being located above a second light source in the housing, the second outlet being outside the housing and located vertically below the second inlet such that when the air in the temperature of a second body of air in the internal chamber is elevated, the second body of air passes upwardly into the second inlet into the second channel, cools, and is released via the second outlet into a second area outside of the chamber.

7. The luminaire of claim 6 wherein the first inlet is located vertically substantially directly above the first light source located in the luminaire and the second inlet is located vertically substantially directly above the second light source thus creating two distinct humidity removal systems driven by convection.

8. The luminaire of claim 6 wherein the first inlet is located on an relatively opposite side of said headlight from the second inlet.

9. The luminaire of claim 6 wherein the second outlet of the second channel member includes a second hydrophobic device.

10. A method for reducing condensation in a vehicle headlight, a headlight having at least one light source included in a housing, the housing defining an internal chamber, and a window through which light from the source is emanated, the method comprising:
    providing a first aperture in the housing;
    creating a conduit between the first aperture and an outside environment; and
    drawing by natural convection hot air vertically upward along a convection pathway up from the area of the light source into the conduit from the internal chamber;
    cooling the air in the conduit such that the relatively humid air falls downward to be released into the outside environment to reduce condensation in said headlight.

11. The method of claim 10 comprising:
    blocking the outlet with a hydrophobic device, such that allowing for the passage of humid air into the environment, but blocking against the introduction of liquid water into the channel from the environment.

12. The method of claim 10 wherein the at least one light source comprises an additional light source, the method comprising:
    spacing a second aperture apart from a location of the first aperture, and receiving by convection from the additional light source hot air through a second conduit from the internal chamber to further the reduce condensation in the internal chamber.

13. A luminaire having a first light source in a housing, the housing defining an internal chamber, and a window through which light from the source is emanated, the luminaire further comprising:
    a first channel member, the first channel member having a first air inlet and a first air outlet;
    the first inlet being a first opening existing in a first location in a top portion of the housing, the first location being substantially directly above the first light source in a pathway of rising heat transfer above the first light source; and
    the first outlet being outside the housing and located vertically below the first inlet such that when the air in the temperature of a first body of air proximate the light source in the internal chamber is elevated, the first body of air rises upward in the housing, upward into the first inlet, then into the first channel, cools, and is released via the first outlet into a first area outside of the chamber.

14. The luminaire of claim 13 wherein the first inlet receives the first body of air through two separate apertures, both of said apertures feeding into the same inlet.

15. The luminaire of claim 14 wherein a second inlet receives a second body of air into a second channel member through a separate aperture formed in a second location in the top of the housing, the second location being substantially directly above a second light source.

16. A headlight having a light source in a housing, a chamber in the headlight comprising:
   a housing having a vent;
   the vent being positioned substantially directly above the light source in the roof of the housing, the vent further positioned in a vertical convection pathway to take in a rising body of air being of elevated temperature, the elevated temperature being elevated by the light source;
   the body of air being received through the vent into a channel member, then cooled in the channel member before reaching an outlet;
   the channel member being configured to allow for the passage of high humidity air out into an outside environment, while preventing water into the housing;
   the first member having an upper portion adapted to rest on a planar upper surface of the housing,
   the first member having a downwardly-extending portion which substantially conforms to and abuts a planar outside surface of the housing to release the body of air at a lateral position outside the housing.

* * * * *